US012731859B2

(12) United States Patent
Xiao et al.

(10) Patent No.: US 12,731,859 B2
(45) Date of Patent: Sep. 8, 2026

(54) ELECTROCHEMICAL CELLS AND METHODS FOR MAKING THE SAME

(71) Applicant: GM GLOBAL TECHNOLOGY OPERATIONS LLC, Detroit, MI (US)

(72) Inventors: Xingcheng Xiao, Troy, MI (US); Meinan He, Birmingham, MI (US); Mei Cai, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 824 days.

(21) Appl. No.: 18/092,957

(22) Filed: Jan. 4, 2023

(65) Prior Publication Data

US 2024/0222789 A1 Jul. 4, 2024

(51) Int. Cl.
*H01M 50/434* (2021.01)
*H01M 10/0525* (2010.01)
*H01M 50/403* (2021.01)

(52) U.S. Cl.
CPC ..... *H01M 50/434* (2021.01); *H01M 10/0525* (2013.01); *H01M 50/403* (2021.01)

(58) Field of Classification Search
None
See application file for complete search history.

(56) References Cited

U.S. PATENT DOCUMENTS 9,065,118 B1 * 6/2015 Kaun .................. H01M 50/406
9,793,525 B2 * 10/2017 Johnson ................ H01M 4/134
2004/0197641 A1 * 10/2004 Visco .................. H01M 10/058 429/105
2018/0345253 A1 * 12/2018 Toyama ................... B01J 29/64
2022/0140394 A1 5/2022 He
2022/0216468 A1 * 7/2022 Gao ...................... H01M 4/628
2022/0246987 A1 8/2022 He
2023/0246295 A1 * 8/2023 Xiao ................... H01M 50/451 429/144
2023/0378609 A1 * 11/2023 Zeng ................. H01M 10/0525
2024/0021787 A1 * 1/2024 Xiao ..................... H01M 4/364
2024/0047823 A1 * 2/2024 Gao .................. H01M 10/0525
2024/0387862 A1 * 11/2024 Otsuka .................. H01M 4/622

* cited by examiner

*Primary Examiner* — Kevin M Bernatz
(74) *Attorney, Agent, or Firm* — Quinn IP Law

(57) ABSTRACT

Electrochemical cells and methods for making electrochemical cells are provided. In one example, an electrochemical cell includes a positive electrode, a negative electrode, and a separator that is disposed between the positive and negative electrodes. The separator is electrically insulating and ionically conductive. An electrolyte is operatively disposed between the positive and negative electrodes and interfaces with the separator to conduct ions between the positive and negative electrodes. A porous ceramic powder impregnated with an intermediate oxidation state alkali metal compound is coupled to one of the separator and the positive electrode.

20 Claims, 3 Drawing Sheets

ELECTROCHEMICAL CELLS AND METHODS FOR MAKING THE SAME

INTRODUCTION

The present disclosure relates generally to electrochemical cells, and more particularly, relates to electrochemical cells including a porous ceramic powder that is impregnated with an intermediate oxidation state alkali metal compound for capturing oxygen that may be generated, for example, during cycling and/or charging of the electrochemical cell, and methods for making such electrochemical cells.

Advanced energy storage devices and systems are in demand to satisfy energy and/or power requirements for a variety of products, including automotive products such as start-stop systems (e.g., 12V start-stop systems), battery-assisted systems, hybrid electric vehicles ("HEVs"), and electric vehicles ("EVs"). Typical lithium-ion batteries include at least two electrodes and an electrolyte and/or separator. One of the two electrodes may serve as a positive electrode or cathode and the other electrode may serve as a negative electrode or anode. A separator and/or electrolyte is be disposed between the negative and positive electrodes. The electrolyte is suitable for conducting lithium ions between the electrodes and, like the two electrodes, may be in solid and/or liquid form and/or a hybrid thereof.

Many different materials may be used to create components for a lithium-ion battery. For example, the negative electrode typically includes a lithium insertion material or an alloy host material. For example, typical electroactive materials for forming an anode include lithium (e.g., lithium metal), graphite and other forms of carbon, silicon and silicon oxide, tin and tin alloys. The positive electrode materials for lithium batteries typically include an electroactive material that can be intercalated with lithium ions, such as lithium-transition metal oxides or mixed oxides, or one or more phosphate compounds, for example including lithium iron phosphate or mixed lithium manganese-iron phosphate.

Cathode materials such as lithium nickel cobalt manganese oxide (e.g., $LiNi_xCo_yMn_zO_2$ (where x+y+z=1)) with a layer structure, which are commonly referred to as NCM, and over lithiated NCM, which are high-energy Li-rich and commonly referred to as HE-NCM, are promising cathode materials due their high operating voltage and high specific capacity. However, reactive singlet oxygen may be released from the cathode when charging NCM and HE-NCM Li-ion batteries to a state of charge (SOC) of, for example, about 80% or greater during battery cycling. This released, reactive oxygen is in gaseous form and can accumulate and/or build up in the battery, potentially leading to battery health issues, degradation, and/or the like.

SUMMARY

An electrochemical cell is provided. The electrochemical cell includes a positive electrode, a negative electrode, and a separator that is disposed between the positive and negative electrodes. The separator is electrically insulating and ionically conductive. The electrochemical cell further includes an electrolyte that is operatively disposed between the positive and negative electrodes and interfaces with the separator to conduct ions between the positive and negative electrodes. The electrochemical cell further includes a porous ceramic powder impregnated with an intermediate oxidation state alkali metal compound coupled to one of the separator and the positive electrode.

In some embodiments, the intermediate oxidation state alkali metal compound includes counterions including an alkali metal ion(s) and an oxide-containing ion(s).

In some embodiments, the alkali metal ion(s) is chosen from a lithium (Li) ion(s), a potassium (K) ion(s), a cesium (Cs) ion(s), or a combination thereof.

In some embodiments, the alkali metal ion(s) comprises a Li ion(s).

In some embodiments, the oxide-containing ion(s) is chosen from a nitrite ion(s), a phosphite ion(s), organo-phosphite ion(s), a sulfite ion(s), a chlorite ion(s), or a combination thereof.

In some embodiments, the porous ceramic powder is chosen from a zeolite powder, an aerogel powder, a porous silica powder, a porous alumina powder, a porous titania powder, or a combination thereof.

In some embodiments, the porous ceramic powder comprises a lithium-ion-exchanged zeolite powder.

In some embodiments, the intermediate oxidation state alkali metal is present in the porous ceramic powder in an amount of from about 1 to about 50 wt. %, based on the total weight of the porous ceramic powder impregnated with the intermediate oxidation state alkali metal compound.

In some embodiments, the porous ceramic powder impregnated with the intermediate oxidation state alkali metal compound forms at least part of a coating that is disposed on the one of the separator and the positive electrode.

In some embodiments, the coating has a thickness of from about 1 to about 10 μm.

In some embodiments, a mass loading of the porous ceramic powder impregnated with the intermediate oxidation state alkali metal compound per unit area of the coating is from about 0.1 to about 10 $mg/cm^2$.

In some embodiments, the porous ceramic powder impregnated with the intermediate oxidation state alkali metal compound is a filler that is dispersed in the one of the separator and the positive electrode.

In some embodiments, the filler is present in the one of the separator and the positive electrode in an amount of from about 1 to about 50 wt. %, based on the total weight of the one of the separator and the positive electrode.

According to an alternative embodiment, an electrochemical cell is provided. The electrochemical cell includes a positive electrode, a negative electrode, and a separator that is disposed between the positive and negative electrodes. The separator is electrically insulating and ionically conductive. The positive electrode, the negative electrode and the separator have pores formed therein. The electrical chemical cell further includes an electrolyte that is infiltrated into the pores of the positive and negative electrodes and the separator to conduct ions between the positive and negative electrodes. The electrical chemical cell further includes a porous ceramic powder impregnated with an intermediate oxidation state alkali metal compound coupled to one of the separator and the positive electrode. The intermediate oxidation state alkali metal compound includes counterions including an alkali metal ion(s) and an oxide-containing ion(s). The alkali metal ion(s) includes a Li ion(s). The oxide-containing ion(s) is chosen from a nitrite ion(s), a phosphite ion(s), organo-phosphite ion(s), a sulfite ion(s), a chlorite ion(s), or a combination thereof. The porous ceramic powder is chosen from a zeolite powder, an aerogel powder, a porous silica powder, a porous alumina powder, a porous titania powder, or a combination thereof.

According to an alternative embodiment, a method for making an electrochemical cell is provided. The method includes impregnating a porous ceramic powder with an intermediate oxidation state alkali metal compound. The method further includes coupling the porous ceramic powder to one of a separator and a positive electrode prior to or subsequent to impregnating the porous ceramic powder with the intermediate oxidation state alkali metal compound. The separator is electrically insulating and ionically conductive. The method further includes disposing the separator between the positive electrode and a negative electrode. The method further includes operatively disposing an electrolyte between the positive and negative electrodes and interfacing with the separator to conduct ions between the positive and negative electrodes.

In some embodiments, coupling the porous ceramic powder includes applying a coating on one of the separator and the positive electrode. The coating includes the porous ceramic powder.

In some embodiments, applying the coating includes forming the coating having a thickness of from about 1 to about 10 μm.

In some embodiments, coupling the porous ceramic powder includes dispersing the porous ceramic powder as a filler in precursor materials after impregnating the porous ceramic powder with the intermediate oxidation state alkali metal compound, and forming the precursor materials including the filler into the one of the separator and the positive electrode.

In some embodiments, the filler is present in the one of the separator and the positive electrode in an amount of from about 1 to about 50 wt. %, based on the total weight of the one of the separator and the positive electrode.

In some embodiments, the method further includes providing the porous ceramic powder having a porosity of from about 15 to about 60 vol. % prior to impregnating the porous ceramic powder with the intermediate oxidation state alkali metal compound.

BRIEF DESCRIPTION OF THE DRAWINGS

The accompanying drawings, which are incorporated into and constitute a part of this specification, illustrate implementations of the disclosure and together with the description, serve to explain the principles of the disclosure.

DETAILED DESCRIPTION

Figure 1:
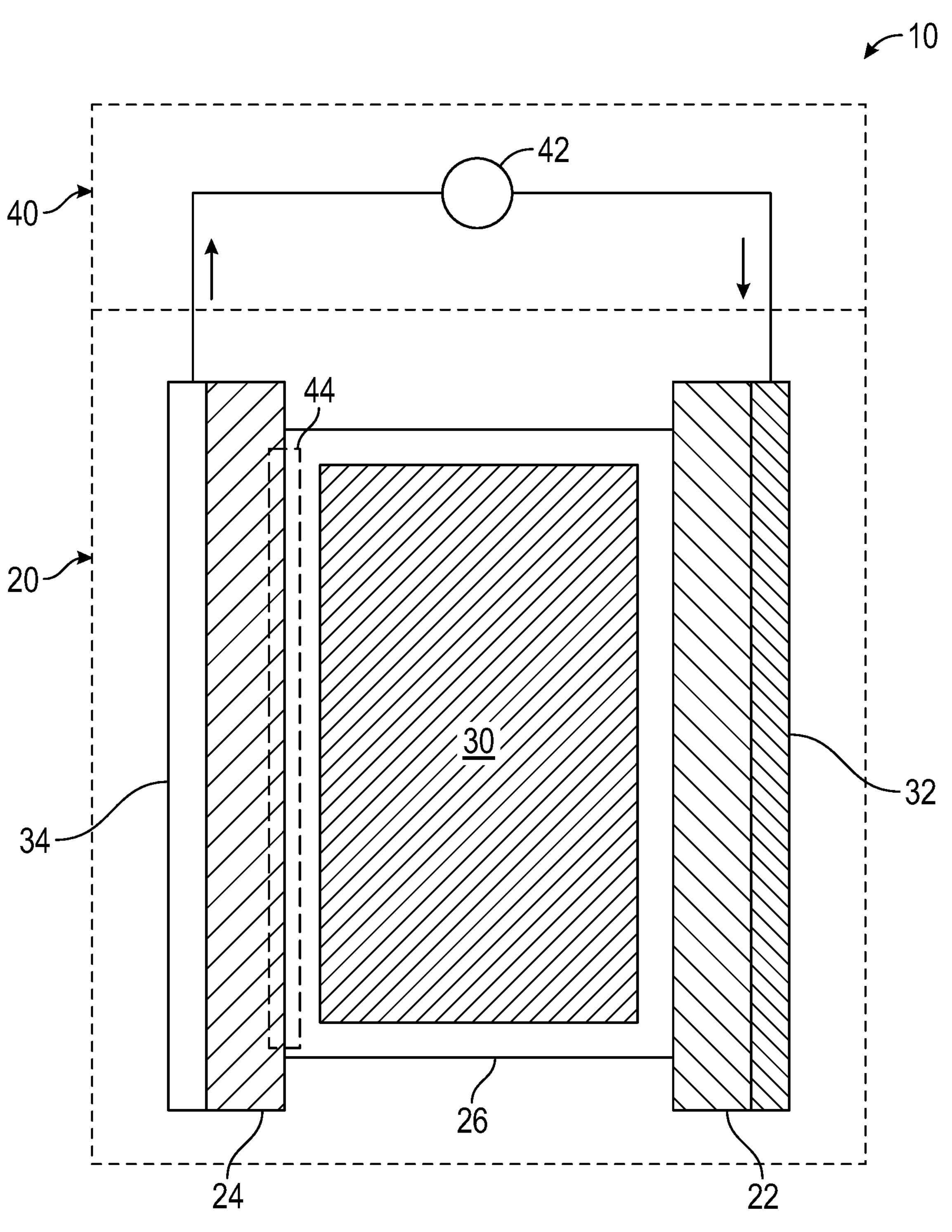
FIG. 1 is a schematic perspective view of an electrochemical cell according to an embodiment of the disclosure.

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Unless specifically stated from context, as used herein, the term "about" is understood as within a range of normal tolerance in the art, for example within 2 standard deviations of the mean. "About" can be understood as within 10%, 5%, 1%, 0.5%, 0.1%, 0.05%, or 0.01% of the stated value. "About" can alternatively be understood as implying the exact value stated. Unless otherwise clear from the context, the numerical values provided herein are modified by the term "about."

The present disclosure relates to electrochemical cells and methods for making electrochemical cells. In accordance with one or more embodiments of the disclosure, an electrochemical cell includes a positive electrode, a negative electrode, and a separator that is disposed between the positive and negative electrodes. The separator is electrically insulating and ionically conductive. An electrolyte is operatively disposed between the positive and negative electrodes (e.g., infiltrated into the porous of the positive and negative electrodes) and interfaces with the separator (infiltrated into the porous of the separator) to conduct ions between the positive and negative electrodes.

A porous ceramic powder impregnated with an intermediate oxidation state alkali metal compound is coupled to one or both of the separator and the positive electrode. As used herein, the phrase "oxidation state" refers to the degree of oxidation of the compound. Further, the phrase "intermediate oxidation state" refers to an intermediate degree of oxidation, for example somewhere between a minimum oxidation state and a maximum oxidation state, where the compound is capable of further oxidation by reacting with oxygen to form a product compound with a higher degree of oxidation or a maximum oxidation state. Additionally, the phrase "coupled to" is understood to mean "joined to," "affixed to," "disposed either directly or indirectly on," and/or "disposed in."

In accordance with one or more embodiments of the disclosure, during battery cycling or charging of the electrochemical cell, oxygen (e.g., singlet oxygen) may be released in a gaseous form or a singlet form from the positive electrode, for example, when the state of charge (SOC) of the electrochemical is at about 80% or greater. Advantageously, the porous ceramic powder impregnated with the intermediate oxidation state alkali metal compound is disposed proximate the positive electrode, for example on and/or in a positive electrode, and/or on and/or in the separator, such that the released oxygen comes into contact with the porous ceramic powder including the intermediate oxidation state alkali metal compound. In accordance with one or more embodiments of the disclosure, advantageously the intermediate oxidation state alkali metal compound reacts with the released oxygen to form a product compound that is in a solid or liquid form and that has a higher degree of oxidation or maximum oxidation state. As such, the released oxygen is converted to or otherwise chemically bound in a solid or liquid form in the product compound and is no longer available, for example, within the electrochemical cell as a reactive gas that would otherwise detrimentally affect the health of the battery. Further, in accordance with one or more embodiments of the disclosure, a solid electrolyte interface (SEI) layer is disposed on and/or about the negative electrode. Advantageously, in accordance with one or more embodiments, the higher oxidation state product compound that is formed from the reaction of the intermediate oxidation state alkali metal compound and oxygen helps to stabilize the SEI layer to improve the health of the battery.

Referring now to the drawings, wherein like numerals indicate like parts in the several views, an electrochemical cell and methods for making an electrochemical cell are shown and described herein. FIG. 1 is a schematic perspective view of an electrochemical cell 10 according to an embodiment of the disclosure. As illustrated, the electrochemical cell 10 is configured as a lithium-ion battery 20. The lithium-ion battery 20 includes a negative electrode 22, a positive electrode 24, and a porous separator 26 (e.g., a microporous or nanoporous polymeric separator) disposed between the negative and positive electrodes 22 and 24. An electrolyte 30 is disposed between the negative and positive electrodes 22 and 24 and interfaces with the porous separator 26, for example, the electrolyte 30 is disposed in pores of the porous separator 26. The electrolyte 30 may also be present in the negative electrode 22 and positive electrode 24, such as in their pores. Although FIG. 1 illustrates the porous separator 26 as being disposed about (e.g., surrounding) the electrolyte 30 and directly interfacing with the negative and positive electrodes 22 and 24, it is to be understood that various other embodiments of lithium-ion batteries may be configured with the porous separator 26 being disposed in and surrounded by the electrolyte 30 (e.g., with the porous separator 26 being spaced apart from the negative and positive electrodes 22 and 24) and the electrolyte 30 directly interfacing with the negative and positive electrodes 22 and 24.

A negative electrode current collector 32 is positioned at or near the negative electrode 22. A positive electrode current collector 34 is positioned at or near the positive electrode 24. While not shown, the negative electrode current collector 32 and the positive electrode current collector 34 may be coated on one or both sides. In certain embodiments, the current collectors 32 and 34 may be coated with an electroactive material/electrode layer on both sides. The negative electrode current collector 32 and positive electrode current collector 34 respectively collect and move free electrons to and from an external circuit 40. The interruptible external circuit 40 includes a load device 42 and connects the negative electrode 22 (through the negative electrode current collector 32) and the positive electrode 24 (through the positive electrode current collector 34).

The porous separator 26 operates as both an electrical insulator and a mechanical support. More particularly, the porous separator 26 is disposed between the negative electrode 22 and the positive electrode 24 to prevent or reduce physical contact and thus, the occurrence of a short circuit. The porous separator 26, in addition to providing a physical barrier between the two electrodes 22, 24, can provide a minimal resistance path for internal passage of lithium ions (and related anions) during cycling of the lithium ions to facilitate functioning of the lithium-ion battery 20.

The lithium-ion battery 20 can generate an electric current during discharge by way of reversible electrochemical reactions that occur when the external circuit 40 is closed (to electrically connect the negative electrode 22 and the positive electrode 24) when the negative electrode 22 contains a relatively greater quantity of cyclable lithium. The chemical potential difference between the positive electrode 24 and the negative electrode 22 drives electrons produced by the oxidation of lithium (e.g., intercalated/alloyed/plated lithium) at the negative electrode 22 through the external circuit 40 toward the positive electrode 24. Lithium ions, which are also produced at the negative electrode, are concurrently transferred through the electrolyte 30 and porous separator 26 towards the positive electrode 24. The electrons flow through the external circuit 40 and the lithium ions migrate across the porous separator 26 in the electrolyte 30 to intercalate/alloy/plate into a positive electroactive material of the positive electrode 24. The electric current passing through the external circuit 40 can be harnessed and directed through the load device 42 until the lithium in the negative electrode 22 is depleted and the capacity of the lithium-ion battery 20 is diminished.

The lithium-ion battery 20 can be charged or re-energized at any time by connecting an external power source (e.g., charging device) to the lithium-ion battery 20 to reverse the electrochemical reactions that occur during battery discharge. The connection of an external power source to the lithium-ion battery 20 compels the lithium ions at the positive electrode 24 to move back toward the negative electrode 22. The electrons, which flow back towards the negative electrode 22 through the external circuit 40, and the lithium ions, which are carried by the electrolyte 30 across the separator 26 back towards the negative electrode 22, reunite at the negative electrode 22 and replenish it with lithium for consumption during the next battery discharge cycle. As such, each discharge and charge event is considered to be a cycle, where lithium ions are cycled between the positive electrode 24 and negative electrode 22. As will be discussed in further detail below, in some embodiments, during cycling or charging of the lithium-ion battery 20, oxygen (e.g., singlet oxygen) may be released from the positive electrode 24, for example, when the SOC of the lithium-ion battery 20 is at about 80% or greater.

The external power source that may be used to charge the lithium-ion battery 20 may vary depending on the size, construction, and particular end-use of the lithium-ion battery 20. Some notable and exemplary external power sources include, but are not limited to, AC power sources, such as an AC wall outlet or a motor vehicle alternator. A converter may be used to change from AC to DC for charging the battery 20.

In many lithium-ion battery configurations, each of the negative electrode current collector 32, negative electrode 22, the separator 26, positive electrode 24, and positive electrode current collector 34 are prepared as relatively thin layers (for example, from several microns to a millimeter or less in thickness) and assembled in layers connected in electrical series and/or parallel arrangement to provide a suitable electrical energy and power package. Furthermore, the lithium-ion battery 20 can include a variety of other components that, while not depicted here, are nonetheless recognized to those of skill in the art. For instance, the lithium-ion battery 20 may include a casing, gaskets, terminal caps, tabs, battery terminals, and other conventional components or materials that may be situated within the battery 20, including between or around the negative electrode 22, the positive electrode 24, and/or the separator 26, by way of example. As noted above, the size and shape of the lithium-ion battery 20 may vary depending on the particular application for which it is designed. Battery-powered vehicles and handheld consumer electronic devices are two examples where the lithium-ion battery 20 would most likely be designed to different size, capacity, and power-output specifications. The lithium-ion battery 20 may also be connected in series or parallel with other similar lithium-ion cells or batteries to produce a greater voltage output, energy, and/or power as required by the load device 42.

Accordingly, the lithium-ion battery 20 can generate electric current to a load device 42 that can be operatively connected to the external circuit 40. While the load device 42 may be any number of known electrically powered devices, a few specific examples of power-consuming load devices include an electric motor for a hybrid vehicle or an all-electric vehicle, a laptop computer, a tablet computer, a cellular phone, and cordless power tools or appliances, by way of example. The load device 42 may also be a power-generating apparatus that charges the lithium-ion battery 20 for purposes of storing energy. In certain other variations, the electrochemical cell may be a supercapacitor, such as a lithium-ion based supercapacitor.

Electrolyte

Electrolytes are generally in solid, liquid, or gel form, and such electrolytes that are capable of conducting lithium ions between the negative electrode 22 and the positive electrode 24 may be used in the lithium-ion battery 20. In certain embodiments, the electrolyte 30 is a non-aqueous liquid electrolyte solution that includes one or more lithium salts dissolved in an organic solvent or a mixture of organic solvents. In certain variations, the electrolyte 30 may include an aqueous solvent (i.e., a water-based solvent) or a hybrid solvent (e.g., an organic solvent including at least 1% water by weight). Appropriate lithium salts generally have inert anions. More specifically, the one or more lithium salts may include one or more cations coupled with one or more anions. Non-limiting examples of cations may be chosen from $Li^+$, $Na^+$, $K^+$, $Al^{3+}$, $Mg^{2+}$, and the like. Non-limiting examples of anions may be chosen from $PF^{6-}$, $BF^{4-}$, $TFSI^-$, $FSI^-$, $CF_3SO_3^-$, $(C_2F_5S_2O_2)N^-$, and the like.

Porous Separator

The porous separator 26 may include, in certain variations, a microporous polymeric separator including a polyolefin, including those made from a homopolymer (derived from a single monomer constituent) or a heteropolymer (derived from more than one monomer constituent), which may be either linear or branched. In certain embodiments, the polyolefin may be polyethylene (PE), polypropylene (PP), or a blend of PE and PP, or multi-layered structured porous films of PE and/or PP. Commercially available polyolefin porous separator membranes include CELGARD® 2500 (a monolayer polypropylene separator) and CELGARD® 2340 (a trilayer polypropylene/polyethylene/polypropylene separator) available from Celgard LLC. In other embodiments, the porous separator 26 may be a porous polyaramid separator.

When the porous separator 26 is a microporous polymeric separator, it may be a single layer or a multi-layer laminate. For example, in one embodiment, a single layer of the polyolefin may form the entire microporous polymer separator 26. In other aspects, the separator 26 may be a fibrous membrane having an abundance of pores extending between the opposing surfaces and may have a thickness of less than 50 microns, for example. As another example, however, multiple discrete layers of similar or dissimilar polyolefins may be assembled to form the microporous polymer separator 26. The microporous polymer separator 26 may also include other polymers alternatively or in addition to the polyolefin such as, but not limited to, polyethylene terephthalate (PET), polyvinylidene fluoride (PVDF), polyamide (nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polymethylpentene, polyolefin copolymers, acrylonitrile-butadiene styrene copolymers (ABS), polystyrene copolymers, polymethylmethacrylate (PMMA), polysiloxane polymers (e.g., polydimethylsiloxane (PDMS)), polybenzimidazole (PBI), polybenzoxazole (PBO), polyphenylenes, polyarylene ether ketones, polyperfluorocyclobutanes, polyvinylidene fluoride copolymers (e.g., PVDF-hexafluoropropylene or (PVDF-HFP)), and polyvinylidene fluoride terpolymers, polyvinylfluoride, liquid crystalline polymers (e.g., VECTRAN® (Hoechst AG, Germany) and ZENITE® (DuPont, Wilmington, Del.)), polyaramides, polyphenylene oxide, cellulosic materials, meso-porous silica, or a combination thereof.

Various commercially available polymers and products for forming the separator 26 are contemplated, as well as the many manufacturing methods that may be employed to produce such a microporous polymer separator 26. As will be discussed in further detail below, a porous ceramic powder impregnated with an intermediate oxidation state alkali metal compound (schematically illustrated by dashed lines 44) may be coupled to the separator 26. For example, during the forming process of the porous separator 26, the porous ceramic powder impregnated with the intermediate oxidation state alkali metal compound 44 may be mixed as a filler(s) into the precursor materials that form the separator 26. Alternatively, or additionally, the surface of the porous separator 26 may be coated with the porous ceramic powder impregnated with the intermediate oxidation state alkali metal compound 44.

Positive Electrode

Positive electrodes 24 are generally formed from or include a lithium-based active material that can undergo lithium intercalation and deintercalation, alloying and dealloying, while functioning as the positive terminal of the lithium-ion battery 20. The positive electrode 24 may include a positive electroactive material. Positive electroactive materials may include one or more transition metal cations, such as manganese (Mn), nickel (Ni), cobalt (Co), chromium (Cr), iron (Fe), vanadium (V), and combinations thereof. In accordance with one or more embodiments of the disclosure, the positive electrode 24 includes NCM cathode materials such as lithium (Li) nickel cobalt manganese oxide (e.g., $LiNi_xCo_yMn_zO_2$ (where x+y+z=1)) with a layer structure, or includes HE-NCM cathode materials of lithiated NCM, which are high-energy Li-rich.

The positive electroactive materials may be powder compositions. The positive electroactive materials may be intermingled with an optional electrically conductive material (e.g., electrically-conductive particles) and a polymeric binder. The binder may both hold together the positive electroactive material and provide ionic conductivity to the positive electrode 24. The polymeric binder may include polyvinylidene fluoride (PVDF), poly(vinylidene chloride) (PVC), poly((dichloro-1,4-phenylene)ethylene), carboxymethoxyl cellulose (CMC), nitrile butadiene rubber (NBR), fluorinated urethanes, fluorinated epoxides, fluorinated acrylics, copolymers of halogenated hydrocarbon polymers, epoxides, ethylene propylene diamine termonomer rubber (EPDM), hexafluoropropylene (HFP), ethylene acrylic acid copolymer (EAA), ethylene vinyl acetate copolymer (EVA), EAA/EVA copolymers, PVDF/HFP copolymers, polyvinylidene difluoride (PVdF), lithium polyacrylate (LiPAA), sodium polyacrylate (NaPAA), sodium alginate, lithium alginate, or a combination thereof.

The positive electroactive material loading in the binder can be large, such as greater than about 80% by weight. For example, the binder can be present at a level of greater than or equal to about 1% by weight to less than or equal to about 20% by weight.

Electrically conductive materials may include graphite, other carbon-based materials, conductive metals, or conductive polymer particles. Carbon-based materials may include, by way of example, particles of KETJEN® black, DENKA® black, acetylene black, carbon black, and the like. Conductive metal particles may include nickel, gold, silver, copper, aluminum, and the like. Examples of a conductive polymer include polyaniline, polythiophene, polyacetylene, polypyrrole, and the like. In certain embodiments, mixtures of electrically conductive materials may be used.

As will be discussed in further detail below, the porous ceramic powder impregnated with the intermediate oxidation state alkali metal compound 44 may be coupled to the positive electrode 24. For example, during the forming process of the positive electrode 24, the porous ceramic powder impregnated with the intermediate oxidation state alkali metal compound 44 may be mixed as a filler(s) into the precursor materials that form the positive electrode 24. Alternatively, or additionally, the surface of the porous separator 26 may be coated with the porous ceramic powder impregnated with the intermediate oxidation state alkali metal compound 44. While the foregoing filler(s), additive(s), and/or composition(s) may be described as powders, in some embodiments these materials lose their powder character following incorporation into the electrode where the associated particles of the supplemental electrically conductive material become a component of the resulting electrode structure.

Negative Electrode

The negative electrode 22 may include a negative electroactive material as a lithium host material capable of functioning as a negative terminal of the lithium-ion battery 20. Common negative electroactive materials include lithium insertion materials or alloy host materials or plating and stripping materials. Such materials can include carbon-based materials, such as lithium-graphite intercalation compounds, lithium-silicon compounds, lithium-tin alloys, or lithium titanate.

In certain embodiments, the negative electrode 22 may include lithium, and in certain variations metallic lithium and the lithium-ion battery 20. The negative electrode 22 may be a lithium metal electrode (LME). The lithium-ion battery 20 may be a lithium-metal battery or cell. Metallic lithium for use in the negative electrode of a rechargeable battery has various potential advantages, including having the highest theoretical capacity and lowest electrochemical potential. Thus, batteries incorporating lithium-metal anodes can have a higher energy density that can potentially double storage capacity, so that the battery may be half the size, but still last the same amount of time as other lithium-ion batteries.

In certain variations, the negative electrode 22 may optionally include an electrically conductive material, as well as one or more polymeric binder materials to structurally hold the lithium material together. For example, in one embodiment, the negative electrode 22 may include an active material including lithium-metal particles intermingled with a binder material chosen from polyvinylidene difluoride (PVDF), ethylene propylene diene monomer (EPDM) rubber, carboxymethoxyl cellulose (CMC), a nitrile butadiene rubber (NBR), lithium polyacrylate (LiPAA), sodium polyacrylate (NaPAA), sodium alginate, lithium alginate, or a combination thereof. Suitable additional electrically conductive materials may include carbon-based material or a conductive polymer. Carbon-based materials may include by way of example, particles of KETJEN® black, DENKA® black, acetylene black, carbon black, and the like. Examples of a conductive polymer include polyaniline, polythiophene, polyacetylene, polypyrrole, and the like. In certain embodiments, mixtures of conductive materials may be used. The negative electrode 22 may include from about 50 to about 100% by weight of an electroactive material (e.g., lithium particles or a lithium foil), optionally greater than or equal to about 30% by weight of an electrically conductive material, and a balance binder.

In some embodiments, a solid electrolyte interface (SEI) layer is disposed on the active material particles in the negative electrode 22. In particular, the SEI layer is a product of electrolyte decomposition at the initial cycles and will passivate the negative electrode 22 surface to mitigate the further decomposition of liquid electrolyte 30 which would irreversibly consume Li and lead to short battery life. The ionic conductivity is of SEI layer is important for low cell internal resistance. In some embodiments, the byproduct from the oxidation reaction between oxygen released from positive electrode 24 and intermediate oxidation state alkali metal compound(s) 48 will deposit on SEI layer and form lithium nitride or other lithium-ion conducive compounds, which improve the SEI layer stability and ionic conductivity.

Current Collectors

The negative and positive electrodes 22 and 24 are generally associated with the respective negative and positive electrode current collectors 32 and 34 to facilitate the flow of electrons between the electrode and the external circuit 40. The current collectors 32 and 34 are electrically conductive and can include metal, such as a metal foil, a metal grid or screen, or expanded metal. Expanded metal current collectors refer to metal grids with a greater thickness such that a greater amount of electrode material is placed within the metal grid. By way of example, electrically-conductive materials include copper, nickel, aluminum, stainless steel, titanium, alloys thereof, or combinations thereof.

The positive electrode current collector 34 may be formed from aluminum or any other appropriate electrically conductive material known to those of skill in the art. The negative electrode current collector 32 may be formed from copper or any other appropriate electrically conductive material known to those of skill in the art. Negative electrode current collectors do not typically include aluminum because aluminum reacts with lithium, thereby causing large volume expansion and contraction.

Porous Ceramic Powder Impregnated with an Intermediate Oxidation State Alkali Metal Compound As briefly discussed above, the porous ceramic powder impregnated with the intermediate oxidation state alkali metal compound 44 is coupled to the separator 26 and/or the positive electrode 24. Further and as will be discussed in more detail below, the porous ceramic powder impregnated with the intermediate oxidation state alkali metal compound 44 may be dispersed as a filler in the separator 26 and/or the positive electrode 24, and/or deposited as a coating, for example, either as a powder coating or dispersed in a coating binder, on the separator 26 and/or the positive electrode 24.

Figure 3:
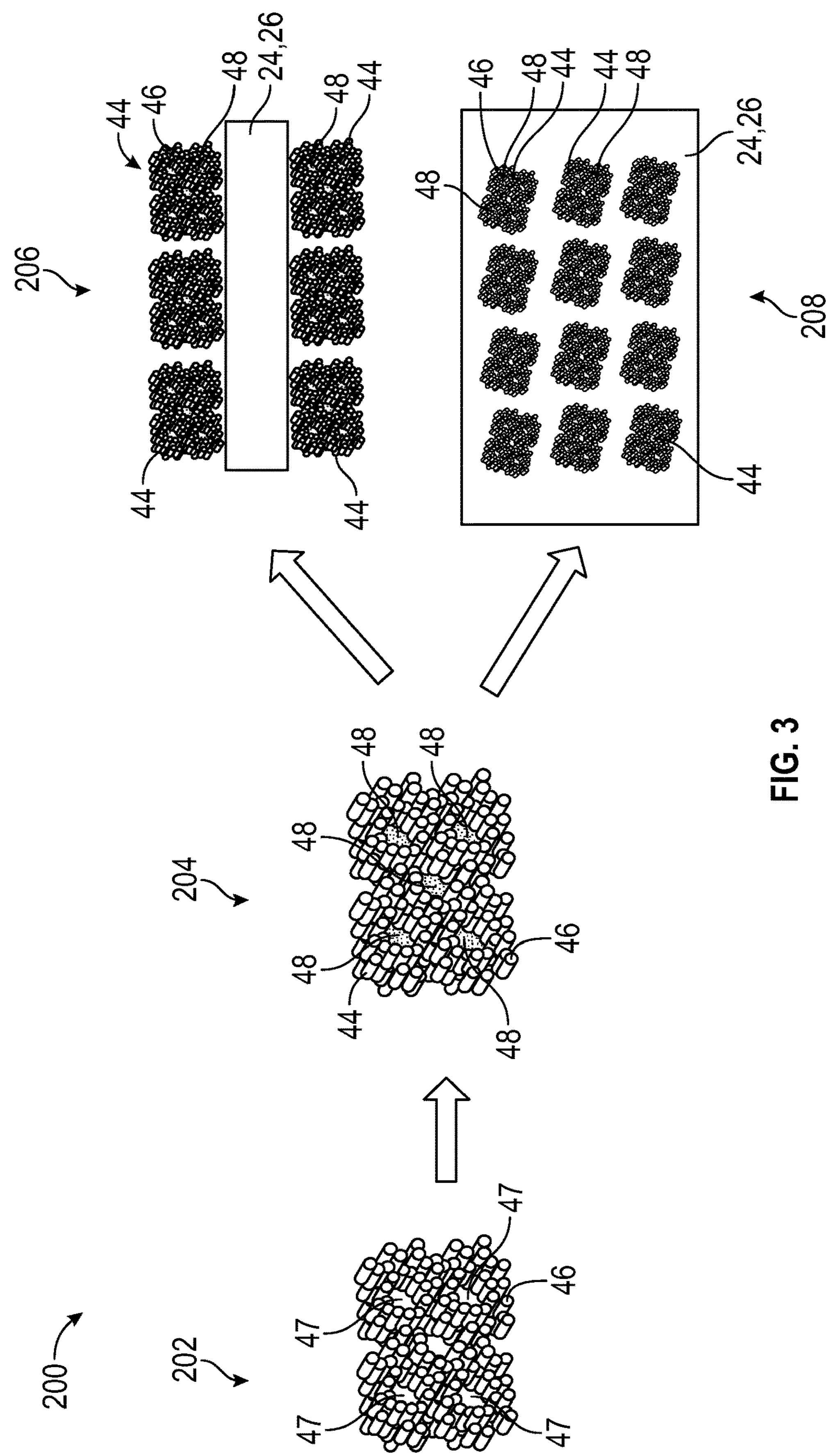
FIG. 3 is a flowchart of a method for making an electrochemical cell according to one or more embodiments of the disclosure.

Referring also to FIG. 3, the porous ceramic powder impregnated with the intermediate oxidation state alkali metal compound 44 is a compound formed from a porous ceramic powder 46 and an intermediate oxidation state alkali metal compound 48 that has been impregnated into the pores 47 of the porous ceramic powder 46. Non-limiting examples of the porous ceramic powder 46 include various types of zeolite powders, aerogel powders, porous silica powders, porous alumina powders, porous titania powders, and the like. In some embodiments, the porous ceramic powder is or includes a lithium-ion-exchanged zeolite powder.

The intermediate oxidation state alkali metal compound 48 includes counterions including alkali metal ions (cations) paired with oxide-containing ions (anions). Examples of the alkali metal ions are Li ions, K ions, and cesium (Cs) ions. In some embodiments, the alkali metal ion(s) includes one or more Li ions. Examples of the oxide-containing ions include nitrite ions, phosphite ions, organo-phosphite ions, sulfite ions, and chlorite ions. In accordance with one or more embodiments, the intermediate oxidation state alkali metal 48 is present in the porous ceramic powder 46 in an amount of from about 1 to about 50 wt. %, such as from about 5 to about 40 wt. %, for example from about 10 to about 30 wt. %, based on the total weight of the porous ceramic powder impregnated with the intermediate oxidation state alkali metal compound 44.

As discussed above, depending upon the composition of the positive electrode 24 and/or the state of charge, during battery cycling or charging of the lithium-ion battery 20, oxygen may be released from the positive electrode 24. In accordance with one or more embodiments of the disclosure, the released oxygen is readily absorbed into and/or adsorbed onto the surfaces and/or pores 47 of the porous ceramic powder 46 and contacts the intermediate oxidation state alkali metal compound 48. The oxygen and the intermediate oxidation state alkali metal compound 48 react to form a product compound (e.g., liquid or solid product) that has a higher degree of oxidation or maximum oxidation state with the released oxygen chemically bound as part of the product compound. In some embodiments, advantageously the product compound provides enhanced cycling stability of the lithium-ion battery 20.

The following examples are provided for illustration purposes only and are not meant to limit the various embodiments of the intermediate oxidation state alkali metal compound 48 in any way.

EXAMPLES—Intermediate Oxidation State Alkali Metal Compounds in a Porous Ceramic Powder Reacting with Released Gaseous Oxygen to Form Product Compounds that have a Higher Degree of Oxidation or Maximum Oxidation State and that is in a Solid or Liquid Form.

Example 1—chemical equation 1 provided below illustrates lithium nitrite (intermediate oxidation state alkali metal compound) reacting with oxygen to form lithium nitrate (product compound with a higher degree of oxidation or maximum oxidation state):

Eq. 1

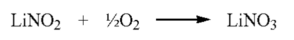

Example 2—chemical equation 2 provided below illustrates lithium phosphite (intermediate oxidation state alkali metal compound) reacting with oxygen to form lithium phosphate (product compound with a higher degree of oxidation or maximum oxidation state):

Eq. 2

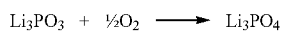

Example 3—chemical equation 3 provided below illustrates lithium sulfite (intermediate oxidation state alkali metal compound) reacting with oxygen to form lithium sulfate (product compound with a higher degree of oxidation or maximum oxidation state):

Eq. 3

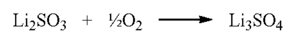

Example 4—chemical equation 4 provided below illustrates lithium chlorite (intermediate oxidation state alkali metal compound) reacting with oxygen to form lithium chlorate (product compound with a higher degree of oxidation or maximum oxidation state):

Eq. 4

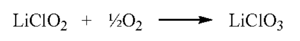

Example 5—chemical equation 5 provided below illustrates potassium nitrite (intermediate oxidation state alkali metal compound) reacting with oxygen to form potassium nitrate (product compound with a higher degree of oxidation or maximum oxidation state):

Eq. 5

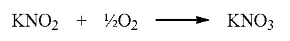

Example 6—chemical equation 6 provided below illustrates potassium phosphite (intermediate oxidation state alkali metal compound) reacting with oxygen to form potassium phosphate (product compound with a higher degree of oxidation or maximum oxidation state):

Eq. 6

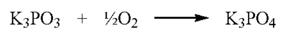

Example 7—chemical equation 7 provided below illustrates potassium sulfite (intermediate oxidation state alkali metal compound) reacting with oxygen to form potassium sulfate (product compound with a higher degree of oxidation or maximum oxidation state):

Eq. 7

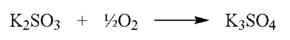

Example 8—chemical equation 8 provided below illustrates cesium nitrite (intermediate oxidation state alkali metal compound) reacting with oxygen to form cesium nitrate (product compound with a higher degree of oxidation or maximum oxidation state):

Eq. 8

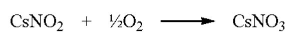

Example 9—chemical equation 9 provided below illustrates cesium phosphite (intermediate oxidation state alkali metal compound) reacting with oxygen to form cesium phosphate (product compound with a higher degree of oxidation or maximum oxidation state):

Eq. 9

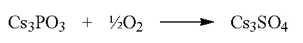

Example 10—chemical equation 10 provided below illustrates cesium sulfite (intermediate oxidation state alkali metal compound) reacting with oxygen to form cesium sulfate (product compound with a higher degree of oxidation or maximum oxidation state):

Eq. 10

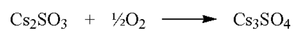

Figure 2:
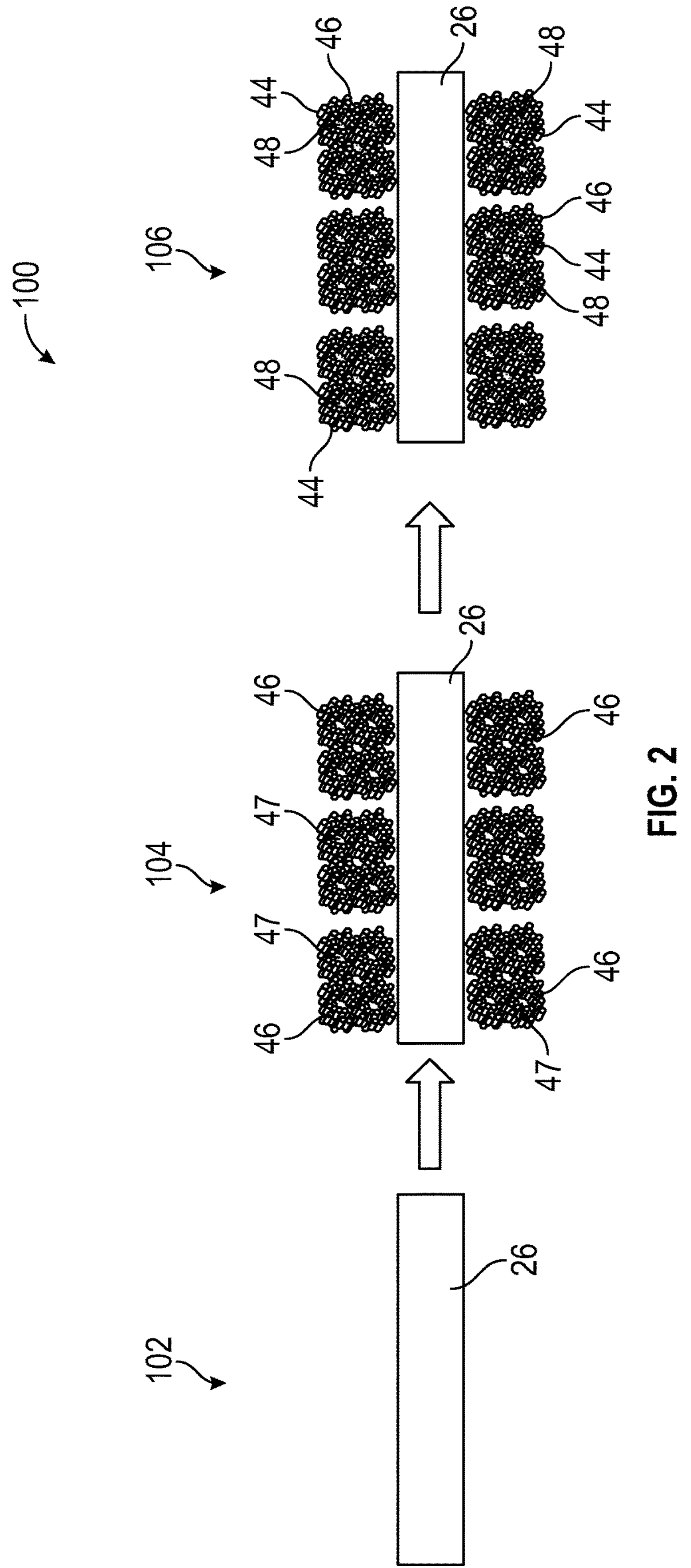
FIG. 2 is a flowchart of a method for making an electrochemical cell according to an embodiment of the disclosure.

FIG. 2 is a flowchart of a method 100 for making a separator 26 for a lithium-ion battery 20 according to an embodiment of the disclosure. FIG. 3 is a flowchart of a method 200 for making a separator 26 and/or a positive electrode 24 for a lithium-ion battery 20 in accordance with one or more embodiments of the disclosure.

Referring to FIG. 2, the method 100 includes providing (STEP 102) the separator 26 as described in the foregoing disclosure. The surface(s) of the separator 26 is coated (STEP 104) with a porous ceramic powder 46. In some embodiments, the porous ceramic powder 46 has a porosity (e.g., having pores 47) of from about 15 to about 60 vol. %. In some embodiments, the porous ceramic powder 46 is coupled and/or applied to the surface(s) of the separator 26 using a powder spray coating process to form a coating, for example, having a thickness of from about 1 to about 10 μm.

The method 100 continues by impregnating (STEP 106) the porous ceramic powder 46 that is disposed on the surface(s) of the separator 26 with an intermediate oxidation state alkali metal compound 48 onto the surfaces and/or into the pores 47 of the porous ceramic powder 46. In some embodiments, the coated separator 26 is immersed in a solution that contains the intermediate oxidation state alkali metal compound 48 and a solvent. Non-limiting examples of the solvent include water-based solvents that include water and optionally other solvents, such as alcohol-based solvents (e.g., methanol, ethanol, and the like), organic-based solvents, for example one or more various alcohols, ketones, ethers, esters, and/or the like. In some embodiments, the solution has a concentration of from about 0.5 to about 2 molarity (M), such as from about 0.75 to about 1.5 M, for example about 1.0 M, of the intermediate oxidation state alkali metal compound 48 in the solvent. In some embodiments, the coated separator 26 is immersed in the solution for a time of from about 1 minute to about 5 hours.

After immersion, the separator 26 with the porous ceramic powder impregnated with the intermediate oxidation state alkali metal compound 44 may be vacuum dried to facilitate removing the solvent from the pores 47 of the porous ceramic powder 46. In some embodiments, vacuum drying the separator 26 with the compound 44 is at vacuum drying process conditions including a temperature of from about 50 to about 130° C., a time of from about 1 to about 24 hours, and a vacuum condition of about 10-1 torr or less. After vacuum drying, the coated separator 26 is assembled into the lithium-ion battery 20 by arranging the separator 26 between the positive electrode 24 and the negative electrode 22, and interfacing with the electrolyte 30 as discussed above.

Referring to FIG. 3, the method 200 includes providing (STEP 202) the porous ceramic powder 46 as described in the foregoing disclosure. The method 200 continues by impregnating (STEP 204) the porous ceramic powder 46 with the intermediate oxidation state alkali metal compound 48 onto the surfaces and/or into the pores 47 of the porous ceramic powder 46. In some embodiments, the porous ceramic powder 46 is immersed in a solution that contains the intermediate oxidation state alkali metal compound 48 in a solvent. Examples of solvents, solution concentrations, and immersion processing conditions with respect to method 200 are the same as provided above with respect to method 100 as described with respect to FIG. 2. Additionally, after immersion, the porous ceramic powder impregnated with the intermediate oxidation state alkali metal compound 44 may be vacuum dried to facilitate removing the solvent as described above with respect to method 100.

After vacuum drying, the method 200 continues by coupling (STEP 206) the porous ceramic powder impregnated with the intermediate oxidation state alkali metal compound 44 to surface(s) of the positive electrode 24 and/or the separator 26 to form a coating. In one example, the porous ceramic powder impregnated with the intermediate oxidation state alkali metal compound 44 is applied to the surface(s) of the positive electrode 24 and/or the separator 26 using a powder spray coating process. Alternatively, the porous ceramic powder impregnated with the intermediate oxidation state alkali metal compound 44 may be applied to the surface(s) of the positive electrode 24 and/or the separator 26 together with a film-forming matrix/polymer and a solvent. In this example, the method 200 additionally includes allowing the solvent to flash off and the film-forming matrix/polymer to cure and/or harden to form the coating. In some embodiments, the coating has a thickness of from about 1 to about 10 μm and a mass loading of the porous ceramic powder impregnated with the intermediate oxidation state alkali metal compound 44 per unit area of the coating from about 0.1 to about 10 mg/cm$^2$.

Alternatively, after vacuum drying, the method 200 continues by dispersing the porous ceramic powder impregnated with the intermediate oxidation state alkali metal compound 44 as a filler in precursor materials and forming the precursor materials (STEP 208) into the positive electrode 24 and/or separator 26. In some embodiments, the filler is present in the positive electrode 24 and/or the separator 26 in an amount of from about 1 to about 50 wt. %, based on the total weight of the corresponding positive electrode 24 or separator 26.

The method 200 continues by assembling the positive electrode 24 and/or separator with the porous ceramic powder impregnated with the intermediate oxidation state alkali metal compound 44 into the lithium-ion battery 20. For example, the separator 26 is arranged between the positive electrode 24 and the negative electrode 22, and interfaces with the electrolyte 30 as discussed above.

While the best modes for carrying out the disclosure have been described in detail, those familiar with the art to which this disclosure relates will recognize various alternative designs and embodiments for practicing the disclosure within the scope of the appended claims.

What is claimed is:

1. An electrochemical cell comprising:

a positive electrode including a lithium transition metal oxide active material that releases oxygen during cycling at a state of charge of the electrochemical cell of about 80% or greater;

a negative electrode including a plurality of active material particles;

a solid electrolyte interface (SEI) layer disposed on the plurality of active material particles;

a separator disposed between the positive and negative electrodes, wherein the separator is electrically insulating and ionically conductive;

an electrolyte operatively disposed between the positive and negative electrodes and interfacing with the separator to conduct ions between the positive and negative electrodes; and a porous ceramic powder impregnated with an intermediate oxidation state alkali metal compound coupled to one of the separator and the positive electrode;

wherein the intermediate oxidation state alkali metal compound is configured to react with oxygen released from the positive electrode to form a product compound having a higher degree of oxidation than the intermediate oxidation state alkali metal compound; and wherein the product compound deposits on the SEI layer of the negative electrode.

2. The electrochemical cell of claim 1, wherein the intermediate oxidation state alkali metal compound comprises counterions including an alkali metal ion(s) and an oxide-containing ion(s).

3. The electrochemical cell of claim 2, wherein the alkali metal ion(s) is chosen from a lithium (Li) ion(s), a potassium (K) ion(s), a cesium (Cs) ion(s), or a combination thereof.

4. The electrochemical cell of claim 2, wherein the alkali metal ion(s) comprises a Li ion(s).

5. The electrochemical cell of claim 2, wherein the oxide-containing ion(s) is chosen from a nitrite ion(s), a phosphite ion(s), organo-phosphite ion(s), a sulfite ion(s), a chlorite ion(s), or a combination thereof.

6. The electrochemical cell of claim 1, wherein the porous ceramic powder is chosen from a zeolite powder, an aerogel powder, a porous silica powder, a porous alumina powder, a porous titania powder, or a combination thereof.

7. The electrochemical cell of claim 1, wherein the porous ceramic powder comprises a lithium-ion-exchanged zeolite powder.

8. The electrochemical cell of claim 1, wherein the intermediate oxidation state alkali metal is present in the porous ceramic powder in an amount of from about 1 wt. % to about 50 wt. %, based on the total weight of the porous ceramic powder impregnated with the intermediate oxidation state alkali metal compound.

9. The electrochemical cell of claim 1, wherein the porous ceramic powder impregnated with the intermediate oxidation state alkali metal compound forms at least part of a coating that is disposed on the one of the separator and the positive electrode.

10. The electrochemical cell of claim 9, wherein the coating has a thickness of from about 1 μm to about 10 μm.

11. The electrochemical cell of claim 9, wherein a mass loading of the porous ceramic powder impregnated with the intermediate oxidation state alkali metal compound per unit area of the coating is from about 0.1 $mg/cm^2$ to about 10 $mg/cm^2$.

12. The electrochemical cell of claim 1, wherein the porous ceramic powder impregnated with the intermediate oxidation state alkali metal compound is a filler that is dispersed in the one of the separator and the positive electrode.

13. The electrochemical cell of claim 12, wherein the filler is present in the one of the separator and the positive electrode in an amount of from about 1 wt. % to about 50 wt. %, based on the total weight of the one of the separator and the positive electrode.

14. An electrochemical cell comprising:

a positive electrode including a lithium transition metal oxide active material that releases oxygen during cycling at a state of charge of the electrochemical cell of about 80% or greater;

a negative electrode including a plurality of active material particles;

a solid electrolyte interface (SEI) layer disposed on the plurality of active material particles;

a separator disposed between the positive and negative electrodes, wherein the separator is electrically insulating and ionically conductive, wherein the positive electrode, the negative electrode and the separator have pores formed therein;

an electrolyte infiltrated into the pores of the positive and negative electrodes and the separator to conduct ions between the positive and negative electrodes; and a porous ceramic powder impregnated with an intermediate oxidation state alkali metal compound coupled to one of the separator and the positive electrode, wherein the intermediate oxidation state alkali metal compound comprises counterions including an alkali metal ion(s) and an oxide-containing ion(s), wherein the alkali metal ion(s) comprises a Li ion(s) and the oxide-containing ion(s) is chosen from a nitrite ion(s), a phosphite ion(s), organo-phosphite ion(s), a sulfite ion (s), a chlorite ion(s), or a combination thereof, and wherein the porous ceramic powder is chosen from a zeolite powder, an aerogel powder, a porous silica powder, a porous alumina powder, a porous titania powder, or a combination thereof;

wherein the intermediate oxidation state alkali metal compound is configured to react with oxygen released from the positive electrode to form a product compound having a higher degree of oxidation than the intermediate oxidation state alkali metal compound; and wherein the product compound deposits on the SEI layer of the negative electrode.

15. A method for making an electrochemical cell, the method comprising:

impregnating a porous ceramic powder with an intermediate oxidation state alkali metal compound;

coupling the porous ceramic powder to one of a separator and a positive electrode prior to or subsequent to impregnating the porous ceramic powder with the intermediate oxidation state alkali metal compound, wherein the separator is electrically insulating and ionically conductive;

disposing the separator between the positive electrode and a negative electrode; and operatively disposing an electrolyte between the positive and negative electrodes and interfacing with the separator to conduct ions between the positive and negative electrodes to thereby form the electrochemical cell;

wherein the electrochemical cell includes:

the positive electrode including a lithium transition metal oxide active material that releases oxygen during cycling at a state of charge of the electrochemical cell of about 80% or greater;

the negative electrode including a plurality of active material particles;

a solid electrolyte interface (SEI) layer disposed on the plurality of active material particles;

the separator disposed between the positive and negative electrodes, wherein the separator is electrically insulating and ionically conductive; and an electrolyte operatively disposed between the positive and negative electrodes and interfacing with the separator to conduct ions between the positive and negative electrodes;

wherein the intermediate oxidation state alkali metal compound is configured to react with oxygen released from the positive electrode to form a product compound having a higher degree of oxidation than the intermediate oxidation state alkali metal compound; and wherein the product compound deposits on the SEI layer of the negative electrode.

16. The method of claim 15, wherein coupling the porous ceramic powder comprises applying a coating on one of the separator and the positive electrode, wherein the coating comprises the porous ceramic powder.

17. The method of claim 16, wherein applying the coating comprises forming the coating having a thickness of from about 1 μm to about 10 μm.

18. The method of claim 15, wherein coupling the porous ceramic powder comprises:

dispersing the porous ceramic powder as a filler in precursor materials after impregnating the porous ceramic powder with the intermediate oxidation state alkali metal compound; and forming the precursor materials including the filler into the one of the separator and the positive electrode.

19. The method of claim 18, wherein the filler is present in the one of the separator and the positive electrode in an amount of from about 1 wt. % to about 50 wt. %, based on the total weight of the one of the separator and the positive electrode.

20. The method of claim 15, further comprising providing the porous ceramic powder having a porosity of from about 15 vol. % to about 60 vol. % prior to impregnating the porous ceramic powder with the intermediate oxidation state alkali metal compound.

* * * * *